United States Patent
Murakami et al.

[11] Patent Number: 5,295,122
[45] Date of Patent: Mar. 15, 1994

[54] FLYING HEAD OF A MAGNETO-OPTICAL RECORDING APPARATUS

[75] Inventors: Akemi Murakami; Hideo Kobayashi; Kiichi Ueyanagi, all of Kanagawa, Japan

[73] Assignee: Fuji Xerox Co., Ltd., Tokyo, Japan

[21] Appl. No.: 910,495

[22] Filed: Jul. 8, 1992

[30] Foreign Application Priority Data

Jul. 9, 1991 [JP] Japan .................. 3-194952

[51] Int. Cl.⁵ .................................. G11B 11/00
[52] U.S. Cl. ........................... 369/13; 369/44.15; 369/44.16; 369/44.17; 369/44.18; 369/44.19; 369/44.21; 369/44.22
[58] Field of Search ........... 369/13, 44.15, 44.16, 369/44.17, 44.18, 44.19, 44.20, 44.21, 44.22; 360/114

[56] References Cited

U.S. PATENT DOCUMENTS

| | | | |
|---|---|---|---|
| 4,506,307 | 3/1985 | Watrous | 360/103 |
| 4,644,641 | 2/1987 | Verdone | 360/103 |
| 4,646,180 | 2/1987 | Ohtsubo | 360/103 |
| 4,796,126 | 1/1989 | Tsuchiya | 360/103 |

FOREIGN PATENT DOCUMENTS 58-118026 7/1983 Japan .
60-261052 12/1985 Japan .

OTHER PUBLICATIONS

"Integrated Reading and Writing Magneto Optical Heads a Way to a Multigigabyte Multi-rigid-disk Drive", Optical Data Storage Feb. 25–27, 1991, pp. 126–129.
"Magneto Optical Reading and Writing Integrated Heads a Way to a Multigigabyte Multi-rigid-disk Drive", SPIE vol. 1499, Optical Data Storage 1991, pp. 238–247.

*Primary Examiner*—Robert J. Pascal
*Assistant Examiner*—R. A. Ratliff
*Attorney, Agent, or Firm*—Finnegan, Henderson, Farabow, Garrett & Dunner

[57] ABSTRACT

Disclosed is a flying head of a magneto-optical recording apparatus, in which a thin film magnetic head is provided separately from an air slider and stuck to a side wall of a light path aperture portion, the portion of the wall surface to which the thin film magnetic head is attached is made inclined so that the flying head has a superior flying characteristic, the modulation of a magnetic field can be performed at a high speed, and the peak position of distribution of intensity of a laser beam is made to align with the peak position of distribution of intensity of a magnetic field.

6 Claims, 6 Drawing Sheets

FLYING HEAD OF A MAGNETO-OPTICAL RECORDING APPARATUS

BACKGROUND OF THE INVENTION

The present invention relates to a flying head of a magneto-optical recording apparatus, and particularly relates to an improved flying head having a superior response to a high frequency and being capable of forming a strong and uniform magnetic field toward the surface of a magneto-optical recording medium.

First the principle of recording in a magneto-optical recording apparatus will be described with reference to FIG. 8. In FIG. 8, the reference numeral 81 represents a recording film constituted by a magnetic material, 82 represents an objective lens, 83 represents a coil, and 84 represents a laser light. The recording film 81 is magnetized in a predetermined direction as shown in FIG. 8(A). This state shows an erasing state. As shown in FIG. 8(B), a current is supplied to the coil 83 to generate a magnetic field in the direction of arrow opposite to the magnetized direction of the recording film 81, and the laser light 84 is focused onto a recording area of the recording film 81 by the objective lens 82 at the same time, thereby irradiating a laser spot to the recording film 81 which is in an erasing state. By the irradiation of a laser spot, it is possible to invert the magnetized direction of a recording portion to thereby perform recording. On the other hand, in order to perform erasure, as shown in FIG. 8(C), a current having a direction opposite to that at the time of recording is supplied to the coil 83 to invert the direction of a magnetic field, and a laser spot is irradiated to a recording portion of the recording film 81 in this state, so that the magnetized direction of the irradiated portion can be returned to the state before recording so as to be in an erasing state.

FIG. 9 is a diagram for explaining the principle of readout. If laser light is irradiated to a recording film in which magnetization recording is performed as explained in FIG. 8, the Kerr rotation angle of its reflected or transmitted wave is changed by the direction of magnetization as shown in the arrow 84a or 84b. By detecting such a change of the Kerr rotation angle, it is possible to readout recorded information.

By the way, a flying head disclosed in Japanese Unexamined Patent Publication No. Sho-60-261052 has been known as an optical head for performing information recording, information readout and information erasing in such a magneto-optical recording apparatus.

FIGS. 10 to 12 show such a flying head, FIG. 10 being a schematic view of the whole, FIG. 11 being an expanded view of a head body portion, FIG. 12 being a sectional view taken on line A—A of the head body portion in FIG. 11. In FIGS. 10 to 12, the reference numeral 100 represents a magneto-optical recording medium, 101 represents a flying head body portion, 102 represents an air slider, 103 represents a reflective prism, 104 represents a light path aperture portion, 105 represents an objective lens, 106 represents a setting groove, 107 represents a coil, 108 represents a coupling arm, 109 represents a driving portion, 110 represents a light source, and 111 represents a light beam.

The flying head body portion 101 is driven by the driving portion 109 through the coupling arm 108 so as to be moved in the radial direction of the magneto-optical recording medium 100 to thereby be positioned. The air slider 102 is formed of a soft magnetic material so as to be floated by an air stream caused by the revolution of the magneto-optical recording medium 100. In the flying head body portion 101, the light path aperture portion 104 is formed in a portion of the air slider 102, and the lens 105 is provided in the light path aperture portion 104, as clearly shown in FIG. 12. In addition, the reflective prism 103 is fixed on the light path aperture portion 104. The light beam 111 from the light source 110 is incident to the reflective prism 103, reflected downward, and focused through the lens 105 onto the magnetic film surface of the magneto-optical recording medium 100. The coil 107 as a magnetic field generating means is wound in the setting groove 106 provided along the aperture edge of the aperture portion 104 on the side of the magneto-optical recording medium 100, so that a magnetic field for writing or erasing can be generated in the magneto-optical recording medium 100 by a current flowing through the coil 107.

In this flying head body portion 101, the coil 107 is mounted on the side of a head, so that there is an advantage to simplify a driving means thereof in comparison with an apparatus, and only the minimum members such as the reflective prism 103, the lens 105, the coil 107 and so on are mounted on the air slider 102, so that it is possible to lighten the head and shorten access time. In addition, the air slider 102 is made to float by an air stream caused by the revolution of the magneto-optical recording medium 100. It is therefore possible to maintain a constant distance between the magneto-optical recording medium 100 and the air slider 102, so that there is an advantage to simplify a focusing mechanism for the lens 105.

In such a flying head, however, the magnetic resonance frequency of its coil system is near 20 MHz, so that there has been a problem that it is difficult to switch the direction of a magnetic field at a high speed not lower than 20 MHz.

On the other hand, an apparatus using a thin film magnetic head with a high resonance frequency as a magnetic field generating means has been reported by Stephane RENARD, et al., "Magneto Optical Reading and Writing Integrated Heads A Way to a Multigigabyte Multi-rigid-disk Drive", OPTICAL DATA STORAGE, (1991), p. 238-247.

FIG. 13 shows a head portion of a magneto-optical recording apparatus using a thin film magnetic head. In FIG. 13, the reference numeral 130 represents a magneto-optical recording medium, 131 represents a flying head body portion, 132 represents an air slider, 133 represents a thin film magnetic head, 134 represents an optical integrated circuit, 135 represents optical fibers, and 136 represents a coupling arm. The flying head body portion 131 is made to float on the magneto-optical recording medium 130 by the air slider 132, and is positioned in a writing or reading track by the coupling arm 136 in the same manner as that in the magneto-optical recording apparatus which has been described with reference to FIGS. 10 to 12. However, light from a light source is led to the flying head body portion 131 through the optical fibers 135. Three fibers are illustrated as the optical fibers 135. One is for input light for writing or reading, and the other two are for outputting light which has been read. These optical fibers 135 are connected to the optical integrated circuit 134. Required branching and connecting circuits are formed in the optical integrated circuit 134, and coupled with a light waveguide path shown in FIG. 14. The thin film magnetic head 133 as a magnetic field generating means is provided on the side edge of the air slider 132 near the optical integrated circuit 134.

FIG. 14 is a sectional view of the flying head body portion 131. Laser light incident from the optical integrated circuit 134 is led to a light waveguide path 142 through an integrated mirror portion 141, and irradiated as laser beam light focused onto a not-shown magneto-optical recording medium disposed below. The reflected light from the magneto-optical recording medium is coupled with the optical integrated circuit 134 through the light waveguide path 142 and the integrated mirror portion 141. The curve L shows the space distribution of the light power of the light irradiated through the light waveguide path 142, and according to the curve L the maximum of the light power is at the center of the light waveguide path 142. The reference numeral 143 represents a thin film magnetic head, which is provided near the light waveguide path 142. The thin film magnetic head 143 is constituted by a pole 144 of a soft magnetic material, a non-magnetic layer 145, a coil 146, a protective layer 147 for the coil 146, and a yoke 148 of a soft magnetic material. The coil 146 is formed into a disc-like wound shape, and its sectional view taken in its diameter direction passing its center is illustrated. If a current is supplied to the coil 146, a magnetic path is formed between the pole 144 and the yoke 148, so that a vertical magnetic field is applied to a not-shown magneto-optical recording medium. The curve M illustrated in the lower side shows the distribution of the intensity of the magnetic field.

In this flying head body portion 131 described in FIGS. 13 and 14, only the minimum members are mounted on the air slider 132, so that it is possible to lighten the flying head body portion 131 and to shorten access time. In addition, the air slider 132 is made to float by an air stream caused by the revolution of the magneto-optical recording medium 130, so that it is possible to maintain a constant distance between the magneto-optical recording medium 130 and the air slider 132. It is therefore possible to simplify a focusing mechanism for the integrated mirror portion 141. In addition, the thin film magnetic head 143 itself is so small as to take a small self-inductance value and a high resonance frequency, so that there is an advantage to make it possible to switch a magnetic field at a high frequency near 100 MHz.

A flying magneto-optical head similar to this has been disclosed in Japanese Unexamined Patent Publication No. Sho-58-118026. This magneto-optical head has a thin film magnetic head 152 on the side surface of a flying body 151 as shown in FIG. 15, focusing a light beam 154 onto a recording portion of a magneto-optical recording medium 150 by use of an objective lens 153. The reference numeral 155 represents a gimbal, and 156 represents an arm.

Although the flying head mounted with a thin film magnetic head described with reference to FIGS. 13 and 14 has such an advantage as mentioned above, there has been a problem that the peak position of distribution of intensity of a vertical magnetic field obtained from the thin film magnetic head does not correspond to the peak position of distribution of intensity of a laser beam irradiated onto a magneto-optical recording medium through an integration mirror as has been described with reference to FIG. 14, and a desired magnetic field is obtained far from the peak position, so that it is necessary to supply a higher current, and the ability of the thin film magnetic head cannot be used effectively. In addition, an optical system constituted by a light waveguide path often has a coupling efficiency with an optical fiber about 10%, so that there has also been a problem that the efficiency of using light is low.

A flying head described with reference to FIG. 15 has an optical system constituted by optical parts such as a lens, and the optical parts are provided on the side surface of the flying body, so that there has been a problem that the stability at the time of flying and running is poor.

SUMMARY OF THE INVENTION

It is therefore an object of the present invention to solve the foregoing problems in the prior art.

It is another object of the present invention to provide a flying head of a magneto-optical recording apparatus, which has a superior flying characteristic and a high magnetic resonance frequency, so that it is possible to perform the modulation of a magnetic field at a high speed.

It is a further object of the present invention to provide a flying head of a magneto-optical recording apparatus in which the peak position of distribution of intensity of a laser beam irradiated onto a magneto-optical recording medium is made to correspond to the peak position of distribution of intensity of a magnetic field generated from a thin film magnetic head, so that it is possible to realize low voltage driving.

In order to attain the foregoing objects, according to an aspect of the present invention, provided is a flying head of a magneto-optical recording apparatus which comprises: a flying head body provided in the vicinity of a revolving magneto-optical recording medium so as to be floated by a air stream caused by the revolution of the magneto-optical recording medium; a lens provided in the flying head body for focusing a light beam from the light source onto a recording surface of the magneto-optical recording medium; and a magnetic field generating means provided in the flying head body for forming a magnetic field toward the recording surface of the magneto-optical recording medium; wherein the flying head body is formed of a magnetic material, the magnetic field generating means is constituted by a thin film magnetic head, and the thin film magnetic head is attached along a beam of light flux on a wall surface of a light path aperture portion.

In the above flying head, preferably, the magnetic field generating means may be constituted by at least two thin film magnetic heads. Preferably, the wall surface of the light path aperture portion includes an inclined surface portion as a portion to which the thin film magnetic head is to be attached. Preferably, the thin film magnetic head may include a magnetic substrate, a non-magnetic substance provided on the substrate, a coil formed of a thin film circuit in plane on the non-magnetic substance, and a yoke formed so as to be in contact with the magnetic substrate at a center portion of the coil.

Glass carbon, barium titanium oxide, calcium titanium oxide, or the like, may be used as the non-magnetic substance forming the above-mentioned flying head.

As described above, the flying head of a magneto-optical recording apparatus according to an aspect of the present invention comprises: the flying head body provided in the vicinity of the revoluting magneto-optical recording medium so as to be floated by an air stream caused by the revolution of the magneto-optical recording medium; the lens provided in the flying head body for focusing a light beam from the light source onto the recording surface of the magneto-optical recording medium; and the magnetic field generating means provided in the flying head body for forming a magnetic field toward the recording surface of the magneto-optical recording medium; the flying head body being formed of a magnetic material, the magnetic field generating means being constituted by a thin film magnetic head, the thin film magnetic head being attached along a beam of light flux on a wall surface of the light path aperture portion. Accordingly, it is possible to make the peak position of distribution of intensity of a magnetic field given to the magneto-optical recording medium accord with the peak position of distribution of power of a laser beam irradiated to the magneto-optical recording medium.

In a preferable embodiment as described above, since the magnetic field generating means is constituted by at least two thin film magnetic heads, it is possible to make the distribution of intensity of the magnetic field be symmetry, so that it is possible to make the peak position of the distribution of intensity of the magnetic field given to the magneto-optical recording medium accurately accord with the peak position of the distribution of power of the laser beam irradiated to the magneto-optical recording medium, and it is also possible to increase the intensity of the magnetic field.

In another preferable embodiment as described above, since the wall surface of the light path aperture portion includes an inclined surface portion as a portion to which the thin film magnetic head is to be attached, it is possible to obtain the distribution of intensity of a magnetic field so sharp that it is possible to give a stronger vertical magnetic field to the magneto-optical recording medium with a lower power.

In a further preferable embodiment as described above, since the thin film magnetic head includes a magnetic substrate, a non-magnetic substance provided on the substrate, a coil formed of a thin film circuit in plane on the non-magnetic substance, and a yoke formed so as to be in contact with the magnetic substrate at a center portion of the coil, it is possible to generate a focused magnetic field, and since the thin film magnetic head is produced separately from the air slider of the flying head, it is possible to provide the thin film magnetic head on the side wall of the light path aperture portion. In addition, since the substrate of the thin film magnetic head is formed of a magnetic substance, it is possible to form the flying head by a non-magnetic substance and to reduce the weight of the flying head.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

An embodiment of the present invention will be described with reference to the drawings.

Figure 1:
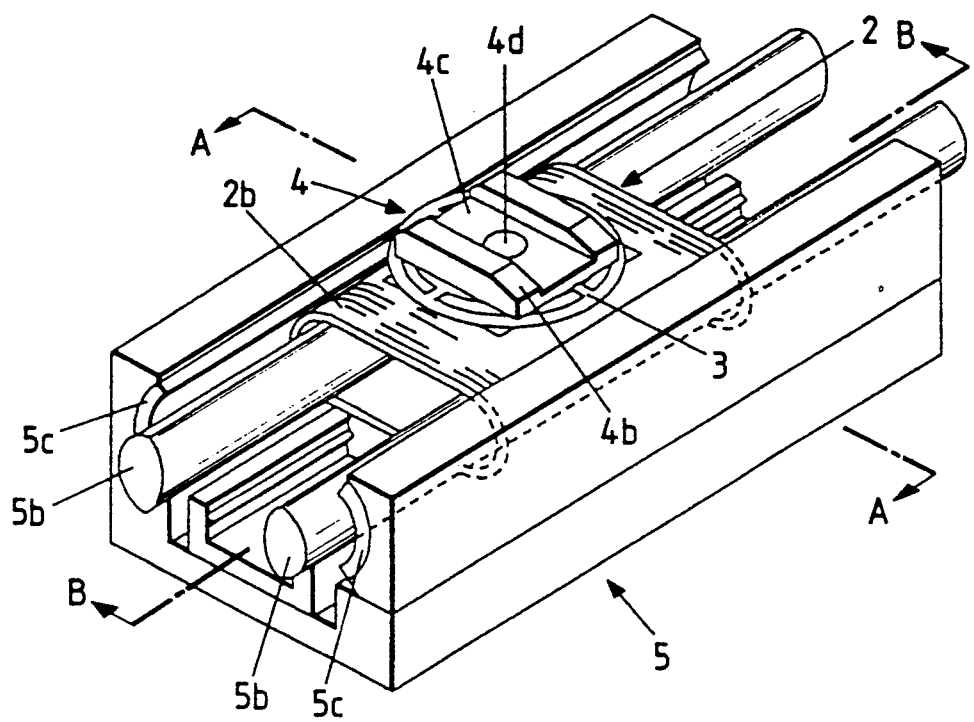
FIG. 1 is a perspective view illustrating a main portion of a magneto-optical recording apparatus of an embodiment of the present invention.
Figure 2:
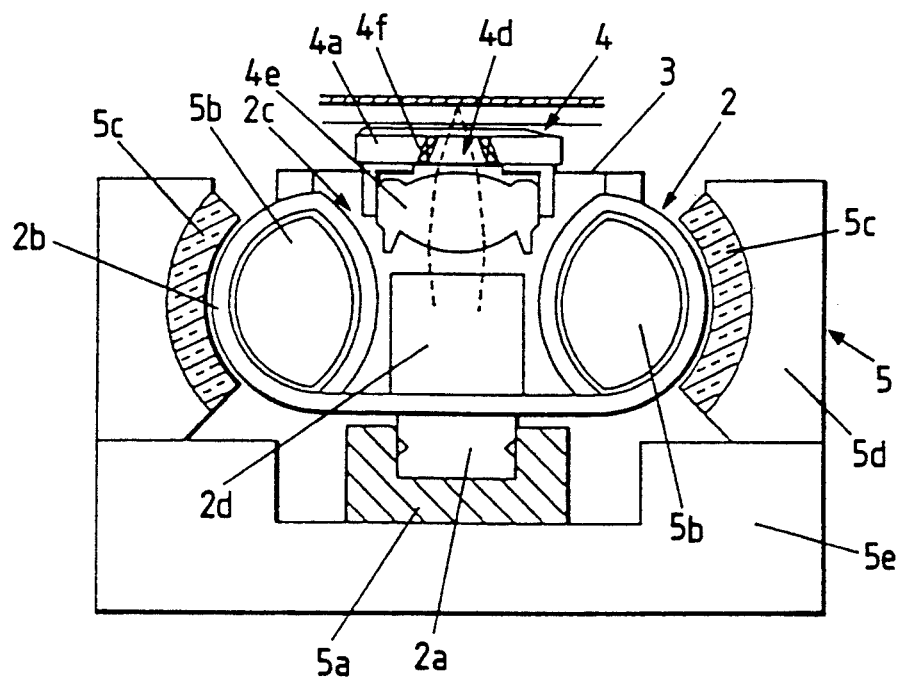
FIG. 2 is a sectional view taken on line A—A of FIG. 1.
Figure 3:
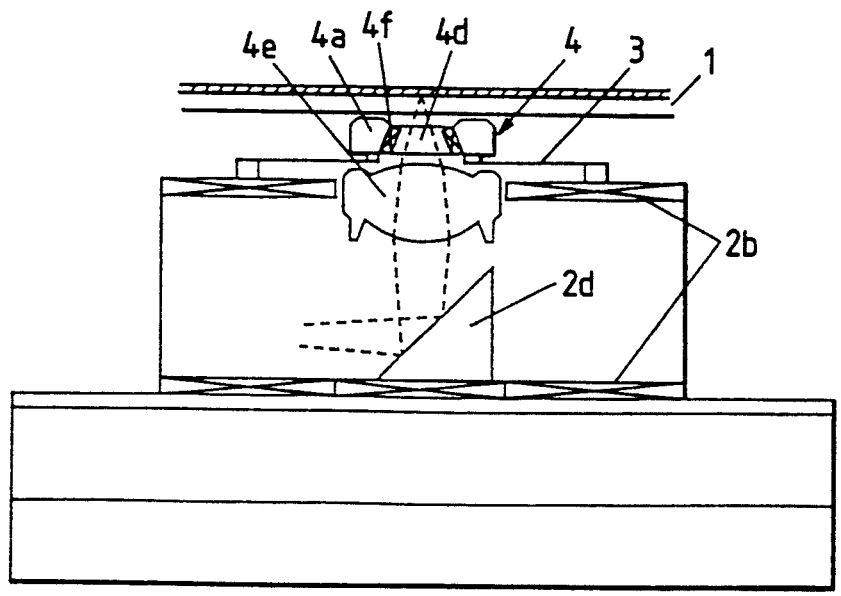
FIG. 3 is a sectional view taken on line B—B of FIG. 1.

FIGS. 1 to 4 shows an embodiment of a magneto-optical recording apparatus of the present invention, FIG. 1 being a perspective view illustrating a main portion of the magneto-optical recording apparatus, FIG. 2 being a sectional view taken on line A—A of FIG. 1, FIG. 3 being a sectional view taken on line B—B of FIG. 1, and FIG. 4 being a diagram for explaining a driving coil. In FIGS. 1 to 4, the reference numeral 1 represents an optical magnetic disc, 2 represents a movable body, 2a represents a carriage, 2b represents a driving coil, 2c represents an aperture portion, 2d represents a reflective prism, 3 represents a spring member, 4 represents a flying head, 4a represents an air slider, 4b represents an air bearing surface, 4c represents a groove, 4d represents a light path aperture portion, 4e represents a lens, 4f represents a thin film magnetic head, 5 represents a driving portion, 5a represents a straight bearing, 5b represents a magnetic yoke, 5c represents a magnet, 5d represents a holding member, and 5e represents a base.

As shown in FIGS. 1 to 3, the main portion of the magneto-optical recording apparatus according to this embodiment is constituted generally by the movable body 2, the spring member 3, the flying head 4, and the driving portion 5 to thereby perform information recording and reproducing on the optical magnetic disc 1. The movable body 2 is arranged so as to support the flying head 4 through the spring member 3, and is driven by the driving portion 5 so as to move and scan a recording area of the optical magnetic disc 1 disposed nearby.

Figure 4A:
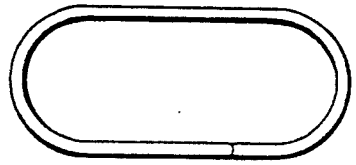
FIG. 4(A) is a sectional view showing a side portion of a driving coil in FIG. 1.
Figure 4B:
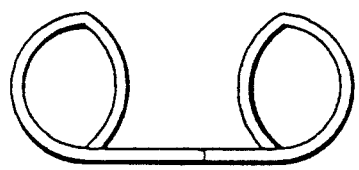
FIG. 4(B) is a sectional view showing a center portion of a driving coil in FIG. 1.

The movable body 2 includes the bobbinless driving coil 2b in which wound coils are combined so as to be integrated with each other by a bonding agent of an epoxy resin group. The driving coil 2b is arranged to be movable along the magnetic yokes 5b by means of the straight bearing 5a as will be described later, and the opposite side portions of the coil 2b viewed in its moving direction are formed into an ellipsoidal cylinder. FIG. 4(A) shows its section, and this condition is also apparent from the shape of the end portions of the driving coil 2b shown in FIG. 1. The spring member 3 and the flying head 4 are disposed in the center portion of the driving coil 2b in FIG. 1. This portion of the driving coil 2b corresponds to the straight portion of the ellipsoidal cylinder, the upper portion of which is recessed down as shown in FIG. 4(B). By making the upper portion of the straight portion recessed down, the rectangular aperture portion 2c is formed in the center portion of the driving coil 2b. Since the recessed upper straight portion of the coil is disposed between lines of the coil in the lower straight portion, the recessed straight portion is not shown. The driving coil 2b is attached to the carriage 2a of aluminum, and the carriage 2a is supported by the straight bearing 5a.

The two magnetic yokes 5b are provided in parallel to the straight bearing 5a, and the circular-arc magnets 5c formed of permanent magnets are provided with predetermined spaces between the magnets 5c and the respective magnetic yokes 5b. The respective magnets 5c are held by the holders 5d of a magnetic material, and the holders 5d are attached to the substrate 5e of a magnetic material. Although magnets of iron including rare earth elements are used as the magnets 5c, the present invention is not limited to this.

Since a portion of the driving coil 2b is inserted into the spaces between the magnetic yokes 5b and the corresponding magnets 5c, if a driving current is supplied to the coil 2b, the driving coil 2b is given a driving force. The driving coil 2b is therefore guided by the straight bearing 5a, so that the driving coil 2b can move along the magnetic yokes 5b.

The reflective prism 2d is fixed into the aperture portion 2c, reflecting a laser beam incident from the ellipsoidal cylindrical aperture portion of the driving coil 2b toward the light path aperture portion 4d. The lens 4e attached to the flying head 4 is provided in a portion of the light path of the laser beam, focusing a beam of light flux irradiated from the light path aperture portion 4d onto the optical magnetic disc 1.

The flying head 4 is supported elastically by the bronze spring member 3 fixed onto the driving coil 2b, and floated by an air stream given through the air slider 4a by the revolution of the optical magnetic disc 1. The air slider 4a includes the air bearing surfaces 4b on the both sides of the surface opposite to the optical magnetic disc 1, and the intermediate portion between the air bearing surfaces 4b acts as the center escape portion 4c so as to stabilize the floating and running of the flying head 4. Taper portions are formed in respective air inflow and outflow ends of the air bearing surfaces 4b in order to smooth the inflow and outflow of air. Although the air slider 4a is formed of alumina ceramics in this embodiment, the present invention is not limited to this case.

The light path aperture portion 4d is provided near the center portion of the air slider 4a. The thin film magnetic head 4f for giving a magnetic field to the focal surface of the optical magnetic disc 1 is provided on the wall side of the light path aperture portion 4d. In addition, the objective lens 4e for focusing a laser beam from a light source onto the focusing surface of the optical magnetic disc 1 is attached to the lower portion of the light path aperture portion 4d (although it is illustrated upside down in the lower, it is in the upper side in practice).

In a magneto-optical recording apparatus arranged thus, the movable body 2 is moved in the track direction of the optical magnetic disc 1 by an electromagnetic force caused by supply of a current to the driving coil 2b in the same manner as in a conventional apparatus, so that the flying head 4 can move and scan under the tracking control. On the other hand, the focusing control is performed by use of a focus adjustment relay lens (not-shown) in the consideration of the quantity of flying of the flying head 4.

Figure 5A:
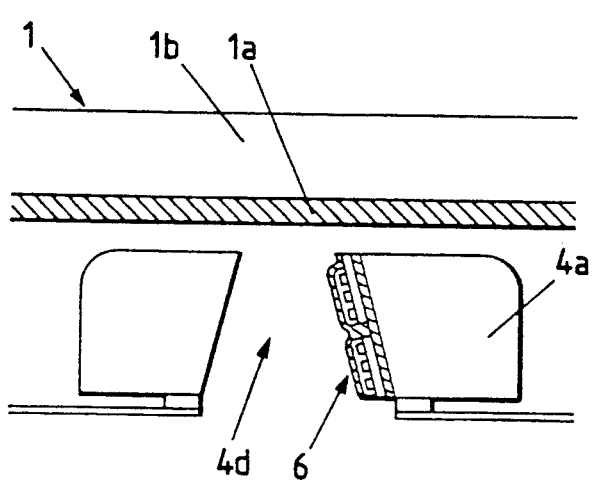
FIG. 5(A) is an expanded sectional view illustrating the neighborhood of a light path aperture portion in FIG. 2.
Figure 5B:
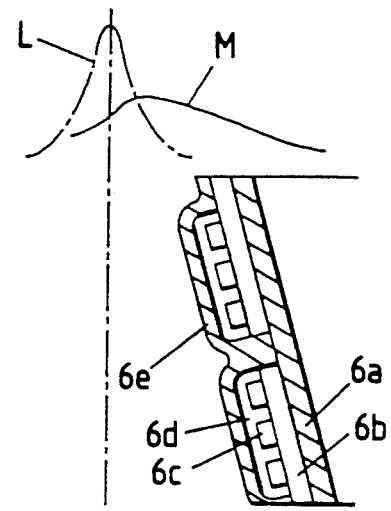
FIG. 5(B) is an expanded sectional view illustrating a coil portion in FIG. 2.
Figure 6:
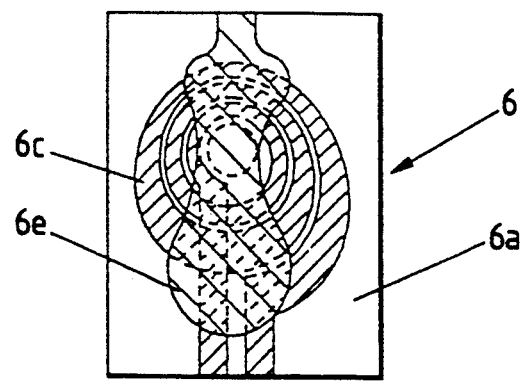
FIG. 6 is a front view illustrating a thin film magnetic head in FIG. 5.

An embodiment of a thin film magnetic head will be described with reference to FIGS. 5 and 6. FIG. 5(A) is an expanded sectional view illustrating the neighborhood of a light path aperture portion in FIG. 2, FIG. 5(B) is an expanded sectional view illustrating a coil portion, and FIG. 6 is a front view illustrating a thin film magnetic head. In FIGS. 5 and 6, the reference numeral 1 represents an optical magnetic disc, 1a represents a magnetic film, 1b represents a substrate, 4a represents an air slider, 4d represents a light path aperture portion, 6 represents a thin film magnetic head, 6a represents a substrate, 6b represents a non-magnetic layer, 6c represents a coil, 6d represents a coil protector layer, 6e represents a yoke. The thin film magnetic head 6 is produced separately from the air slider 4a of a flying head 4, and stuck onto the side wall of the light path aperture portion 4d. The air slider 4a is illustrated partially.

The substrate 6a is formed of a high permeable material such as FeNi. The non-magnetic layer 6b is formed on the substrate 6a, and the coil 6c is patterned thereon by evaporation. After the coil protector layer 6d is deposited, the yoke 6e of a magnetic material is formed. The yoke 6e is formed in the diameter direction to pass through the center portion of the substantially circularly formed coil 6c and is in contact with the substrate 6a in its center portion since the non-magnetic layer 6b is omitted there. At the opposite ends of the yoke 6e, the non-magnetic layer 6b is interposed between the opposite ends of the yoke 6e and the substrate 6a so as to act as magnetic poles. If a current is supplied to the coil 6c, a magnetic path is formed between the yoke 6e and the substrate 6a, so that a magnetic field is generated from the magnetic poles of the yoke 6e to the magnetic film 1a of the optical magnetic disc 1.

In order to record information by the magneto-optical recording apparatus which has been described with reference to FIG. 1 to 6, a current is supplied to the thin film magnetic head 4f (6 in FIGS. 5 and 6) built in the flying head 4 so that a magnetic field of the direction corresponding to the information to be recorded is generated so as to apply a vertical magnetic field modulated at a high speed to the magnetic film 1a of the optical magnetic disc 1. On the other hand, a laser beam from a semi conductor laser (not-shown) is focused by the objective lens 4e onto a recording portion of the magnetic film 1a of the optical magnetic disc 1 through the reflective prism 2d so that information is recorded under the condition that the direction of magnetization at the recording portion is made to accord with the direction of the magnetic field generated from the thin film magnetic head 4f. As seen from FIG. 5, the wall surface of the light path aperture portion 4d irradiated with a laser beam is inclined, and the thin film magnetic head 4f is obliquely attached to the wall surface so that it is possible to bring the peak area of the intensity distribution L of the laser beam in the magnetic film 1a closer to the peak area of the intensity distribution M of a magnetic field generated in the magnetic film 1a by the thin film magnetic head 4f.

In order to readout the recorded information, the current conduction to the magnetic head 4f is stopped, and a non-modulated laser beam having intensity that the temperature of the magnetic film 1a does not reach its Curie point so as to give no bad influence to the recorded information is irradiated to the magnetic film 1a. Since this laser beam is reflected as light turned, by the magnetic Kerr effect, along the direction of magnetization at the irradiated portion, reproduction is performed by judging the direction of polarization of this reflected beam.

Figure 7:
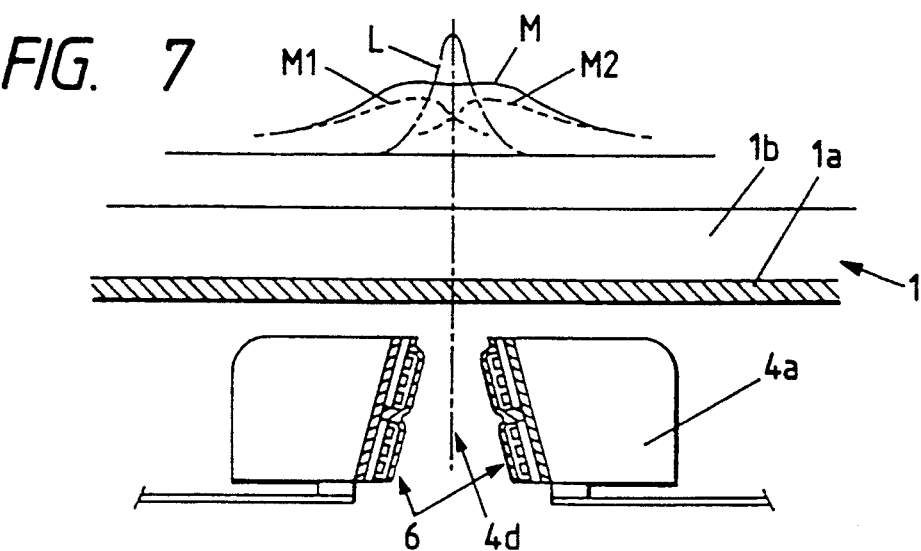
FIG. 7 is an expanded sectional view illustrating another embodiment of a thin film magnetic head.
Figures 8A, 8B, 8C:
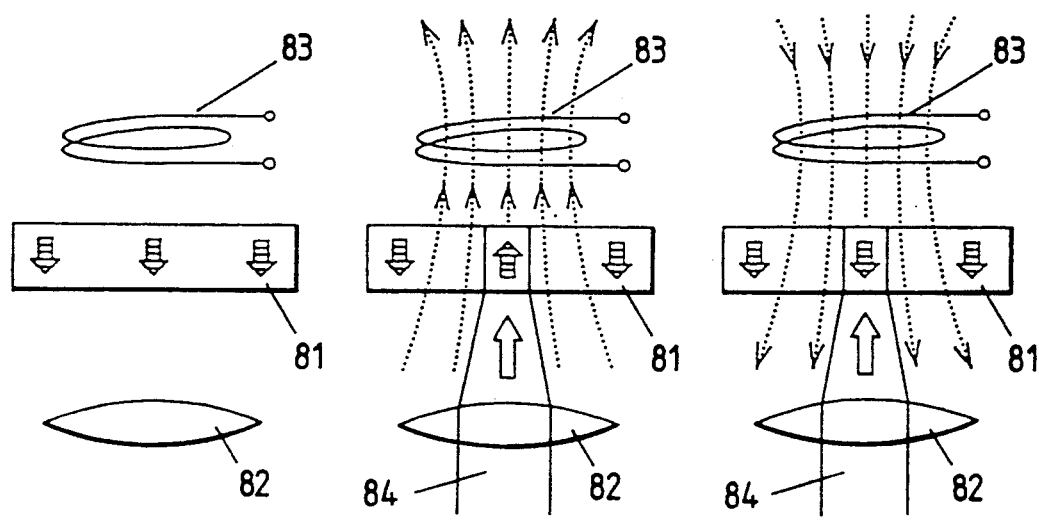
FIG. 8(A) is a diagram showing an erasing state of a recording film.
FIG. 8(B) is a diagram showing of performing record of a recording film.
FIG. 8(C) is a diagram showing of performing erasure of a recording film.
Figure 9:
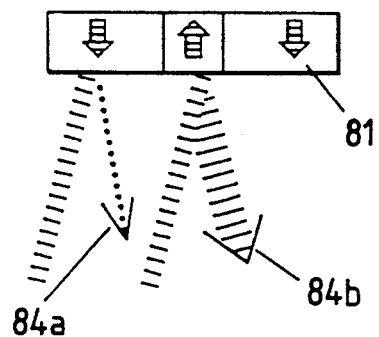
FIG. 9 is a diagram for explaining the principle of readout of a magneto-optical recording apparatus.
Figure 10:
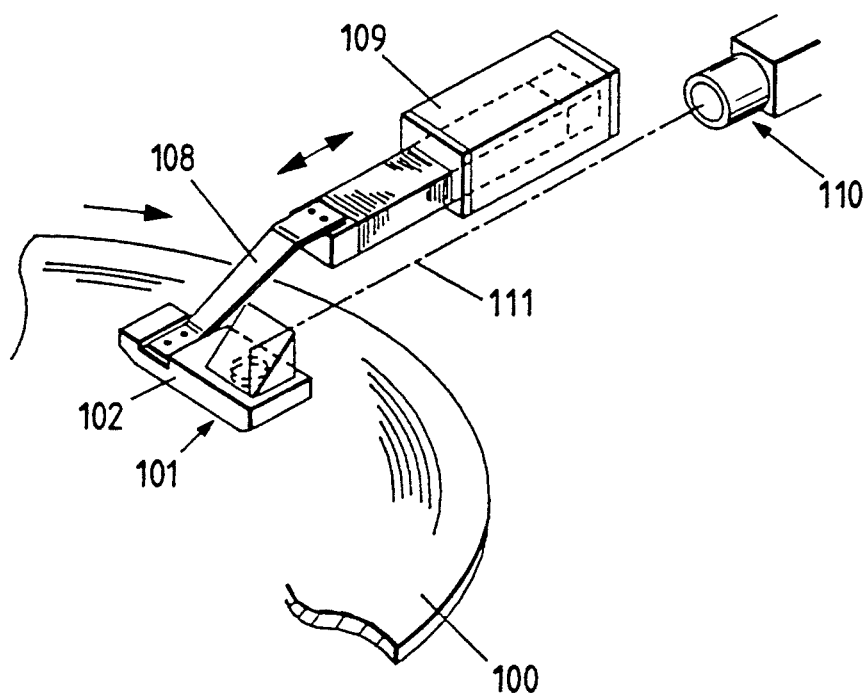
FIG. 10 is a schematic diagram illustrating an example of a conventional magneto-optical recording apparatus.
Figure 11:
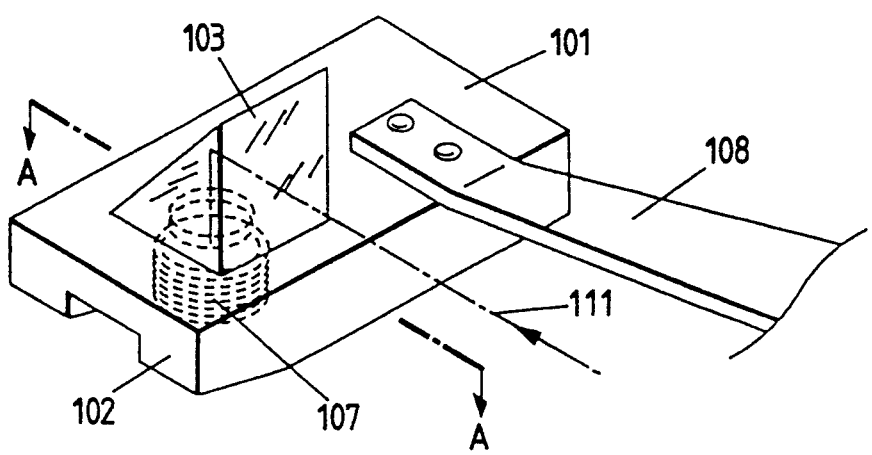
FIG. 11 is an expanded diagram illustrating a head body portion in FIG. 10.
Figure 12:
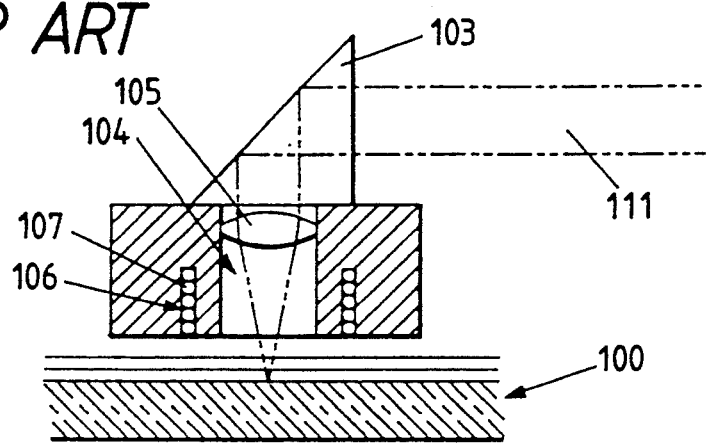
FIG. 12 is a sectional view taken on line A—A of FIG. 11.
Figure 13:
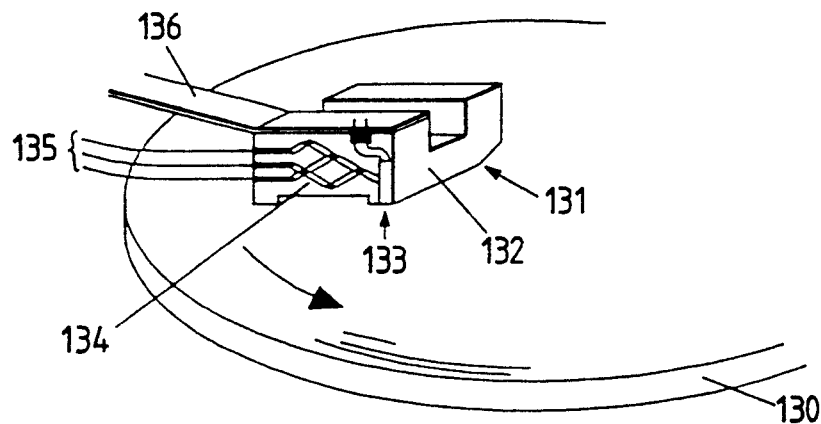
FIG. 13 is a schematic diagram illustrating an example of a magneto-optical recording apparatus using a conventional thin film magnetic head.
Figure 14:
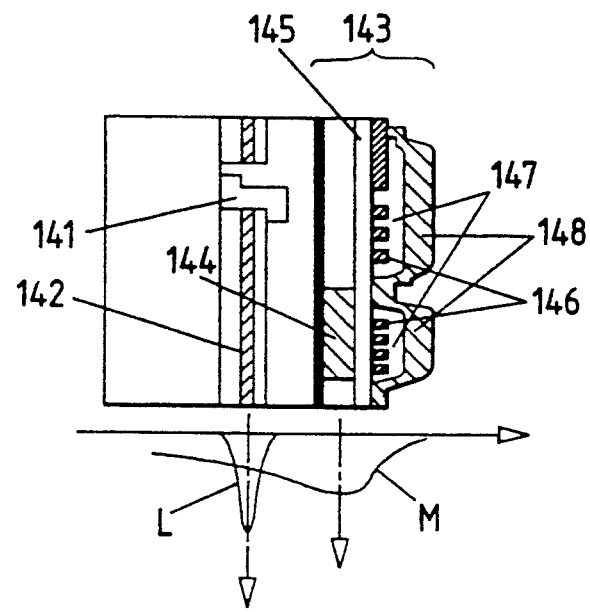
FIG. 14 is a sectional view illustrating a flying head body portion in FIG. 13.
Figure 15:
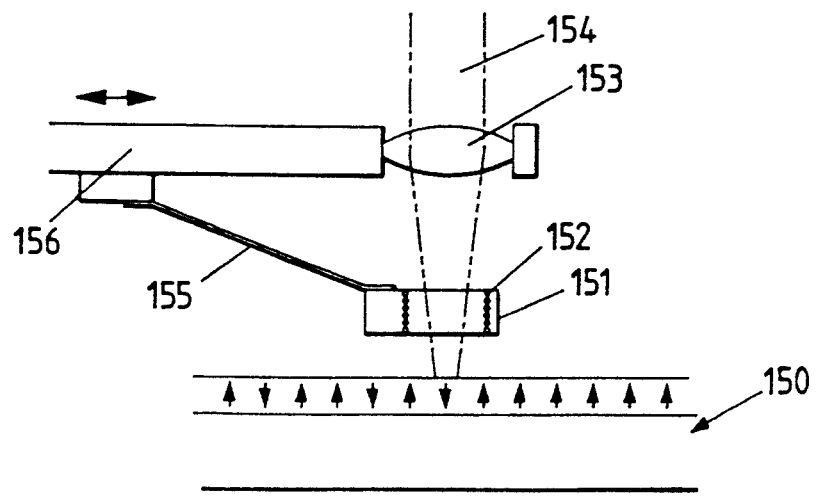
FIG. 15 is a diagram for explaining another example of a magneto-optical recording apparatus using a conventional thin film magnetic head.

FIG. 7 is an expanded sectional view illustrating another embodiment of the thin film magnetic head and showing the neighborhood of a light path aperture portion similar to that in FIG. 5. In FIG. 7, the intensity distributions of laser light and a magnetic field are illustrated in the upper portion. Although this embodiment is similar to that shown in FIG. 5, two thin film magnetic heads 6 are provided on the wall surface portions of a light path aperture portion 4d in this embodiment. The intensity distributions M1 and M2 of the magnetic fields obtained by the respective thin film magnetic heads 6 are as illustrated by the dotted lines so that the intensity distribution M of the combined magnetic field becomes large in its center portion as illustrated by the real line. Even if the maximum value of distribution of a magnetic field obtained by one thin film magnetic head is shifted more or less from a focal point of a laser as illustrated, therefore, the magnetic fields generated from the two thin film magnetic heads are combined so that it is possible to obtain a combined magnetic field having the maximum value near the focal portion of the intensity distribution L of a laser power. It is therefore possible to obtain desired intensity of a magnetic field necessary for recording, even if a current value lower than that in the case of using a conventional thin film magnetic head is supplied to the thin film magnetic heads.

Needless to say, the number of thin film magnetic heads is not limited in two, but it may be more than two.

In order to effectively receive flying pressure from a magneto-optical recording medium, it is necessary to form at least an air bearing surface and an air lead-in surface on the bottom side of an air slider of a flying head. In addition, in order to stabilize the flying running of the flying head, the center escape groove 4c as a concave groove for allowing air to escape along its longitudinal direction is provided on the bottom of the air slider in FIG. 1. The number and shape of concave grooves of this escape portion may be established arbitrarily in accordance with the purpose thereof, and such concave grooves are not always required.

The shape of a light path aperture portion formed in the flying head and mounted with a lens may be formed so as to have such a flat wall surface that a thin film magnetic head can be built thereon, and so as not to break the spot of a beam. If a slope toward the inside of the incident direction of the beam is formed on the inner wall surface of the light path aperture portion, there is an advance that it is possible to concentrate a magnetic field from a thin film magnetic head to a beam focal point of a magneto-optical recording medium. The effect is conspicuous particularly in the case of establishing the inclined angle of the light path inner wall surface into almost the same as the focusing angle of a beam.

Although the case of applying the present invention to a magneto-optical recording apparatus of a light modulating magneto-optical recording system has been described in the above embodiment, the present invention is not to be limited to this case, but, needless to say, the present invention may be applied to a magneto-optical recording apparatus of a magnetic field modulation type magnetic recording system. In addition, as to the magneto-optical recording medium, the present invention may be applied to a desired magneto-optical recording medium such as an optical magnetic disc device, an optical card, or the like.

As has been described above, according to the present invention, it is possible to make a magnetic resonance frequency so high that it is possible to modulate a magnetic field at a high speed. In addition, it is possible to make a flying characteristic superior, and it is possible to make the peak position of the distribution of intensity of a laser beam irradiated to a magneto-optical recording medium accord with the peak position of distribution of intensity of a magnetic field generated from a thin film magnetic head, so that there is an advantage that it is possible to obtain desired intensity of a magnetic field necessary for recording with a current value lower than a conventional one.

What is claimed is:

1. A flying head of a magneto-optical recording apparatus, comprising:

a flying head body provided in the vicinity of a revolving magneto-optical recording medium so as to float on an air stream caused by said revolving magneto-optical recording medium, said flying head body including a light path aperture portion having a side wall;

a lens provided in said light path aperture portion of said flying head body for focusing a light beam from a light source onto a recording surface of said magneto-optical recording medium; and a magnetic field generating means provided in said flying head body for forming a magnetic field directed toward said recording surface of said magneto-optical recording medium;

wherein said flying head body is formed of a non-magnetic material, said magnetic field generating means is comprises a thin film magnetic head, and said thin film magnetic head being attached to said wall surface of said light path aperture portion in proximity to the light beam.

2. A flying head of a magneto-optical recording apparatus according to claim 1, in which said magnetic field generating means includes by at least two thin film magnetic heads.

3. A flying head of a magneto-optical recording apparatus according to claim 1, in which said wall surface of said light path aperture portion includes an inclined surface portion as a portion to which said thin film magnetic head is to be attached.

4. A flying head of a magneto-optical recording apparatus according to claim 1, in which said thin film magnetic head includes a magnetic substrate, a non-magnetic substance provided on said substrate, a coil formed of a planar thin film circuit on said non-magnetic substance, and a yoke formed so as to be in contact with said magnetic substrate at a center portion of said coil.

5. A flying head of a magneto-optical recording apparatus according to claim 4, wherein said magnetic substrate comprises FeNi.

6. A flying head of a magneto-optical recording apparatus according to claim 4, wherein said non-magnetic substrate is comprised of one of a group of glass carbon, barium titanium oxide, and calcium titanium oxide.

* * * * *

UNITED STATES PATENT AND TRADEMARK OFFICE
CERTIFICATE OF CORRECTION

PATENT NO. : 5,295,122
DATED : March 15, 1994
INVENTOR(S) : Akemi Murakami et al.

It is certified that error appears in the above-indentified patent and that said Letters Patent is hereby corrected as shown below:

Claim 1, Column 10, Line 54 Delete "is".

Claim 2, Column 10, Line 60 Delete "by".

Signed and Sealed this

Fourteenth Day of February, 1995

Attest:

BRUCE LEHMAN

*Attesting Officer*     *Commissioner of Patents and Trademarks*